US008573511B2

(12) United States Patent
Sandahl

(10) Patent No.: US 8,573,511 B2
(45) Date of Patent: Nov. 5, 2013

(54) DUAL VOLTAGE ELECTROMAGNET MOTOR FOR AIRLESS FLUID SPRAYER

(75) Inventor: Jeffrey E. Sandahl, Buffalo, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 869 days.

(21) Appl. No.: 12/726,646

(22) Filed: Mar. 18, 2010

(65) Prior Publication Data

US 2010/0237161 A1 Sep. 23, 2010

Related U.S. Application Data

(60) Provisional application No. 61/161,834, filed on Mar. 20, 2009.

(51) Int. Cl.
*B05B 7/30* (2006.01)

(52) U.S. Cl.
USPC ............. 239/351; 239/332; 310/50; 310/158; 310/179; 310/184

(58) Field of Classification Search
USPC ............. 239/332, 351; 310/50, 179, 184, 158
See application file for complete search history.

(56) References Cited

U.S. PATENT DOCUMENTS

| 4,693,423 A * | 9/1987 | Roe et al. ................. 239/332 |
| 4,835,409 A | 5/1989 | Bhagwat et al. |
| 5,691,591 A * | 11/1997 | McCann .................. 310/198 |
| 6,168,093 B1 * | 1/2001 | Greer et al. ............... 239/332 |
| 6,286,609 B1 | 9/2001 | Carrier et al. |
| 7,360,720 B2 * | 4/2008 | Gohring et al. ............. 239/351 |
| 2006/0219824 A1 * | 10/2006 | Alexander et al. .......... 239/690 |

FOREIGN PATENT DOCUMENTS

| EP | 1043829 A2 | 10/2000 |
| EP | 1479448 A2 | 11/2004 |
| EP | 2168686 A2 | 3/2010 |
| WO | 2004035224 A2 | 4/2004 |
| WO | 2010047800 A2 | 4/2010 |

OTHER PUBLICATIONS

International Search Report and Written Opinion of the International Searching Authority for PCT/US2010/027776 filed on Mar. 18, 2010.

* cited by examiner

*Primary Examiner* — Dinh Q Nguyen
(74) *Attorney, Agent, or Firm* — Theodore M. Magee; Westman, Champlin & Koehler, P.A.

(57) ABSTRACT

The present disclosure generally relates to systems and devices for spraying fluid materials such as paints, stains, and the like, and more specifically, but not by limitation, to a dual voltage electromagnet motor for an airless fluid sprayer. In one example, a dual-voltage electric airless fluid sprayer is provided and includes a fluid reservoir and a pump configured to receive fluid from the fluid reservoir. An electric motor is operably coupled to the pump and includes a plurality of windings. The plurality of windings include a first winding portion having a first wire gauge and a first number of windings and a second winding portion having a second wire gauge and second number of windings. A power-module receiving portion is configured to receive a power module to couple one of the first or second winding portions to a source of electrical power.

20 Claims, 5 Drawing Sheets

DUAL VOLTAGE ELECTROMAGNET MOTOR FOR AIRLESS FLUID SPRAYER

CROSS-REFERENCE TO RELATED APPLICATION

The present application is based on and claims the benefit of U.S. provisional patent application Ser. No. 61/161,834 filed Mar. 20, 2009, the content of which is hereby incorporated by reference in its entirety.

BACKGROUND

Portable airless fluid sprayers are known. Such sprayers generally provide a compact handheld device that provides the speed and professional finish of an airless sprayer. These sprayers are highly useful for spraying fluids, such as paint, on wood siding, wood fences, metal surfaces, stucco, lawn furniture, and lattices. Typically paints that are suitable for such sprayers include latex paints, oil-based paints, stains, varnishes, and sealers. Given that the spray gun is portable, it is generally provided with a portable paint supply container that typically has an approximately one quart capacity. In other examples, a remote paint container (such as paint pail or paint can placed on a floor) can be utilized. An extended intake assembly (e.g., a suction tube assembly) provides a fluid path to the spray gun and has a length sufficient to allow the spray gun operator to move about a work site, for example. A number of such devices are sold by Wagner Spray Tech Corporation of Plymouth, Minn. under the trade designations 4.2 Power Stainer, 4.2 Power Sprayer, 4.8 Power Painter, and 5.2 Power Painter, among others.

The discussion above is merely provided for general background information and is not intended to be used as an aid in determining the scope of the claimed subject matter.

SUMMARY

In one exemplary embodiment, a dual-voltage electric airless fluid sprayer is provided and includes a fluid reservoir and a pump configured to receive fluid from the fluid reservoir. An electric motor is operably coupled to the pump and includes a plurality of windings. The plurality of windings include a first winding portion having a first wire gauge and a first number of windings and a second winding portion having a second wire gauge and second number of windings. A power-module receiving portion is configured to receive a power module to couple one of the first or second winding portions to a source of electrical power.

In another exemplary embodiment, a dual-voltage electric airless fluid sprayer is provided and includes an electric motor configured to drive a fluid pump mechanism and a power module receptacle including a plurality of electrical contacts for engaging a source of electrical power. The power module receptacle is configured to receive a first power module having a first voltage such that a first set of the plurality or electrical contacts electrically engage the first power module. The power module receptacle is also configured to receive a second power module having a second voltage such that a second, different set of the plurality of electrical contacts electrically engage the second power module.

In another exemplary embodiment, a method of operating a fluid sprayer having a electric motor is provided. The method includes coupling a first power module having a first voltage to a power module receptacle of the fluid sprayer and operating the fluid sprayer by applying power from the first power module to a first set of windings of the electric motor.

The first set of windings has a first wire gauge and a first number of windings. The method includes decoupling the first power module from the power module receptacle and coupling a second power module having a second voltage to the power module receptacle. The method includes operating the fluid sprayer by applying power from the second power module to a second set of windings of the electric motor. The second set of windings has a second wire gauge and a second number of windings.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 is a perspective view of a portable airless fluid sprayer, under one embodiment.

FIG. 2 is a cross-sectional view of an airless fluid sprayer having a dual voltage electromagnet motor, under one embodiment.

FIG. 3 is a perspective view of a dual voltage electromagnet motor, under one embodiment.

FIG. 4 is a block diagram of an airless fluid sprayer including a dual voltage electromagnet motor, under one embodiment.

FIG. 5 illustrates a battery pack configured to provide DC power to a dual voltage electromagnet motor, under one embodiment.

FIG. 6 illustrates a module configured to provide AC power to a dual voltage electromagnet motor, under one embodiment.

DETAILED DESCRIPTION

An exemplary airless fluid sprayer includes an electromagnet motor that is operably coupled to a source of electrical power, such as a wall outlet. These motors, accordingly, operate on such alternating current (AC) power at voltages ranging from approximately 100 volts (V) AC to approximately 120 VAC. In some applications, motors may be configured to operate on 240 VAC. Additionally, the AC voltage, at least in the United States, is typically provided at a frequency of 60 Hz. A limitation of such electrical power being provided by wall outlets is that an electrical cord to the wall outlet constrains use of the portable gun. Thus, there is a desire to provide a portable fluid spray gun that not only can operate on electrical power supplied by a wall outlet, but also is operable using a portable battery pack providing direct current (DC) power.

Portable battery packs generally have voltages that are much lower than voltages supplied by a wall outlet. One exemplary voltage used for a battery pack of a fluid spray gun is 18 VDC. While those skilled in the art recognize that voltages can easily be changed using a transformer, those skilled in the art also recognize that a transformer is a relatively heavy and bulky electrical component. A transformer includes a number of windings, and a core that allows fields generated by voltage at a first potential to interact with secondary coils to generate a voltage at a second potential. Thus, while a transformer would allow a portable airless spray gun to be operated using multiple voltages, it would also undesirably add additional weight to the portable device. A quart of fluid, such as paint, can weigh approximately two pounds. When that weight is added to the physical weight of the device itself, a user's outstretched arm can quickly become fatigued. Accordingly, for portable airless fluid spray guns, weight is an enormous concern and is preferably minimized.

Embodiments and aspects disclosed in the present application generally configure an electromagnet motor of a portable airless fluid sprayer to include two sets of windings. In one example, the first set of windings is sized to generate suitable magnetic fields to operate the motor when the first set of windings is coupled to a first voltage, such an 18 volt (V) DC battery pack supply. A second set of windings is also provided on the motor that can be coupled to a wall outlet that provides, for example, 120 volts AC.

Figure 1:
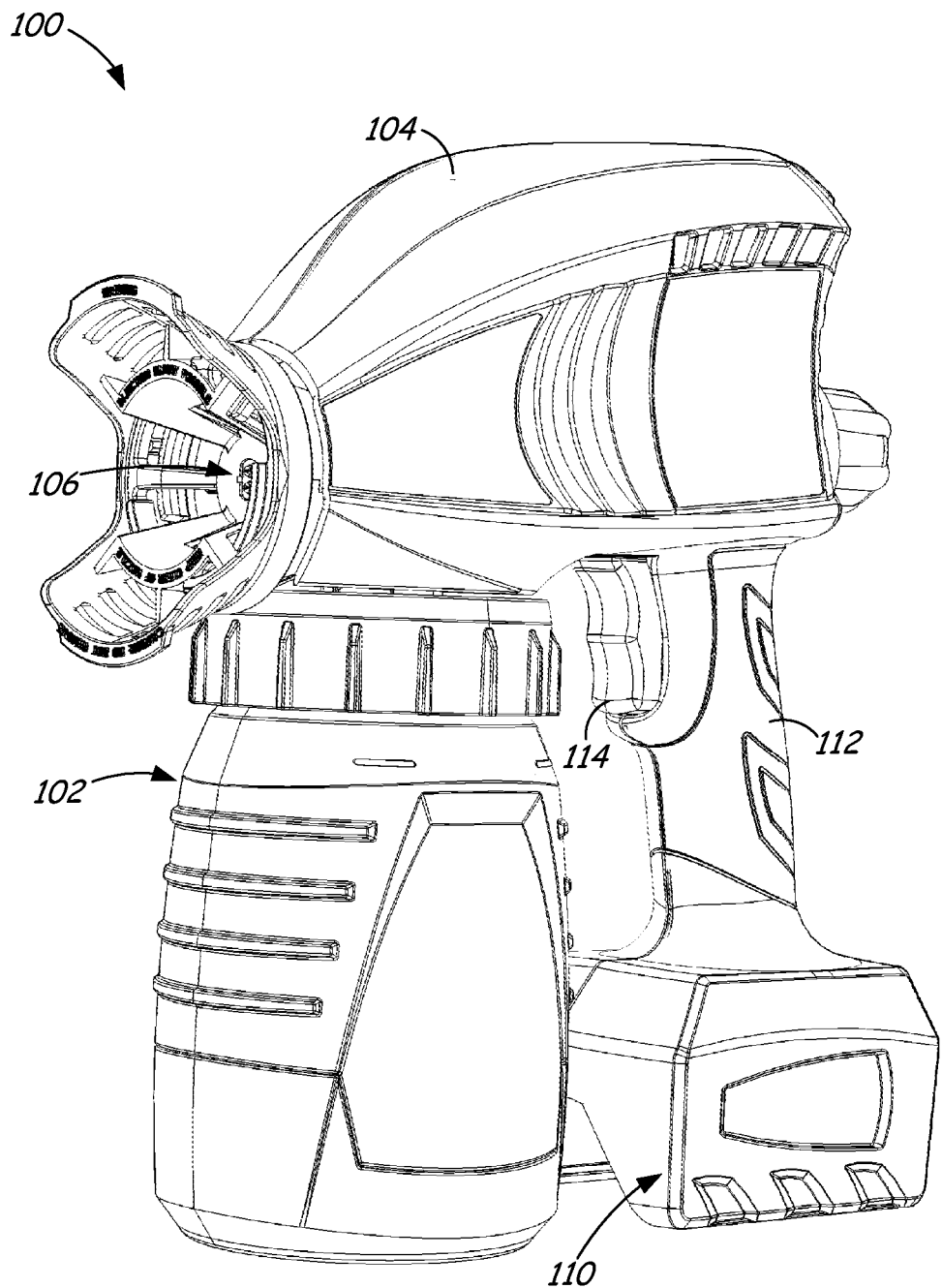

FIG. 1 illustrates an exemplary fluid sprayer 100 configured to spray a fluid material (e.g., liquid materials such as paints, varnishes, stains, food products, pesticides, inks, and the like) through the air onto a surface. In the embodiment illustrated in FIG. 1, sprayer 100 comprises a handheld spray gun; however, sprayer 100 can include other configurations and can be utilized to spray other types of material.

Spray gun 100 illustratively comprises an airless system and uses a pump mechanism for pumping the paint material from a paint source, illustratively a fluid container 102. In other embodiments, spray gun 100 can comprise an air-driven or air-assisted system.

Spray gun 100 includes a housing 104 containing electrical components for controlling operation of sprayer 100 and an electric drive or motor operably coupled to drive the pump mechanism. The pump mechanism pressurizes paint supplied from container 102, which is delivered to an output nozzle 106 having a particular size and shape for generating a desired spray pattern. A suction tube assembly (not shown in FIG. 1) is positioned within container 102 and supplies a fluid path from container 102.

Spray gun 100 also includes handle 112 and trigger 114 that enable a user to hold and control the operation of spray gun 100. A power source supplies power for spray gun 100. For example, the power source can comprise a power cord connected to an alternating current (AC) power source, such as a wall outlet. In another example, the power source can comprise a direct current (DC) power source, such as a battery pack. An exemplary battery pack can include primary (e.g., non-rechargeable) batteries and/or secondary (e.g., rechargeable) batteries.

In the illustrated embodiment, handle 112 includes a power source receptacle 110 configured to accommodate a power source and provide power to the electric motor of spray gun 100. In one embodiment, the power source receptacle 110 is configured to receive a DC power source, such as a battery pack, and an AC power source, such as a module connected to a wall outlet by a power cord. In this manner, spray gun 100 can be operated using either an AC or DC power source. In one embodiment, the connection structures of the AC and DC power sources received by receptacle 110 have the same or substantially similar form factors, enabling the AC and DC power sources to be accommodated by receptacle 110 interchangeably.

Figure 2:
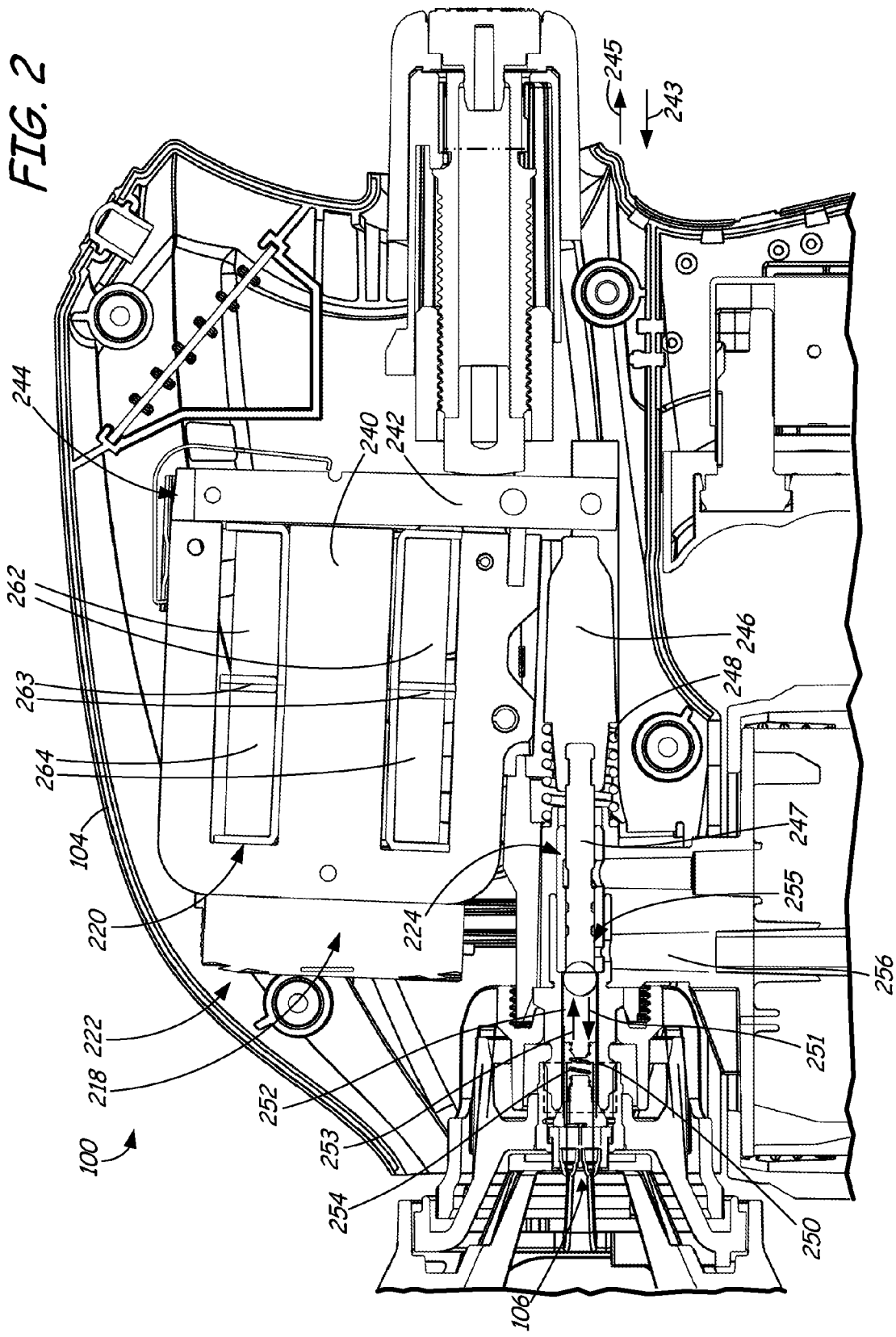

FIG. 2 is a cross-sectional view of spray gun 100. FIG. 2 illustrates one embodiment of an electric drive or motor that is operable to drive a pump mechanism. As shown, an electromagnet motor 218 comprises a reciprocating electromagnetic actuator 222 that is configured to drive a pump mechanism 224. In one embodiment, actuator 222 operates by applying current pulses to coil(s) 220 of actuator 222.

Reciprocating electromagnetic actuator 222 includes a magnetic armature 242. Coil(s) 220 can include one or more coils comprising a plurality of windings that are wrapped around at least a portion of a laminated stack (or "core") 240. In the illustrated embodiment, the core/coil assembly is stationary or fixed within the housing 104 while the armature 242 is configured to move or pivot using a pivot assembly 244, for example. Thus, the armature 242 moves in one or more directions 243, 245 with respect to the core/coil assembly based on the current applied to windings of coil(s) 220. In the illustrated embodiment, when current is applied to windings of coil(s) 220 the armature 242 is magnetically attracted toward the core(s) 240 (in a direction represented by arrow 243). The force at which the armature 242 is attracted toward the core 240 is proportional to (or otherwise related to) the amount of current applied to windings of coil(s) 220.

Armature 242 is configured to mechanically contact and drive the pump mechanism. For instance, in the illustrated embodiment armature 242 contacts and drives a plunger 246, which is connected to a piston 247 that moves with a portion of the pump mechanism (for example, within a cylinder). Movement of piston 247 drives fluid through fluid path 250 toward output 106. The fluid is supplied from a fluid source (i.e., fluid container 104) though a fluid tube 256. A check valve 252 is provided in the fluid path 250 and allows fluid flow in a first direction 251. The check value 252 is biased by a spring 254 to restrict, or prevent the flow of fluid in a second direction 253.

A biasing mechanism (illustratively a spring 248) provides a biasing force for piston 247 in a direction 245, which is opposite the direction 243 in which piston 247 is driven by armature 242. In this manner, armature 242 comprises a reciprocating member that moves or oscillates in response to forces applied by spring 248 and the magnetic field interaction between coil(s) 220 and armature 242.

By way of example, during a first action a current is applied to windings of coil(s) 220 causing the armature 242 to actuate piston 247 and drive paint through path 250 to output 106. During a second action, the current in windings of coil(s) 220 is removed (or otherwise reduced) causing the spring 248 to actuate the piston 247 toward the armature 242. As the piston 247 is actuated by the spring 248 in direction 245, spring 254 closes the check valve 252 and additional fluid is drawn from the fluid container through the fluid tube 256. The additional fluid is then pumped through the fluid path 250 to the output 106 during a subsequent action of the pump mechanism. In one embodiment, the current applied to windings of coil(s) 220 is pulsed between high and low values to cause reciprocation of armature 242 to drive piston 247.

Figure 3:
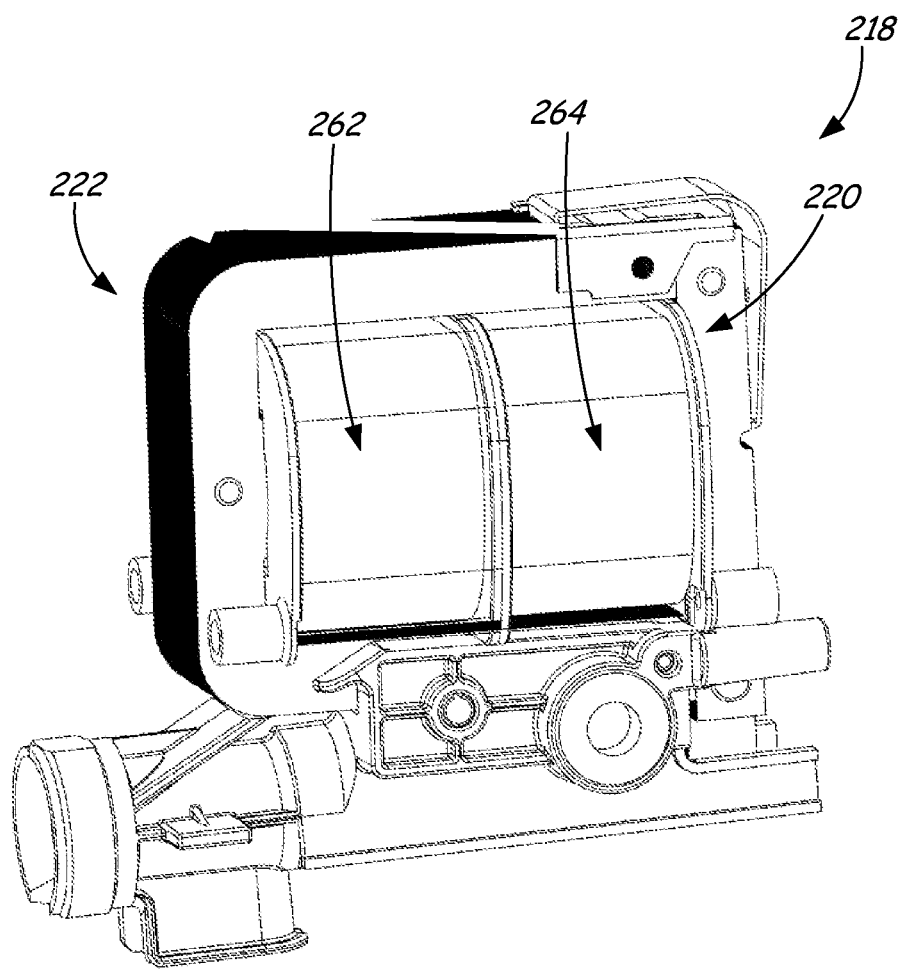

In the illustrated embodiment, the electromagnet motor 218 comprises a dual voltage electromagnet motor. FIG. 3 is a perspective view of motor 218. As shown in FIGS. 2 and 3, the plurality of windings of coil(s) 220 comprise two portions (illustratively two sets of windings). A first set of windings 262 is sized to generate suitable magnetic fields to operate the motor when the first set of windings 262 is coupled to a first voltage source, such as an 18 volt (V) DC battery pack supply. A second set of windings 264 is sized to generate suitable magnetic fields to operate the motor when the second set of windings 264 is coupled to a second voltage source, such as a wall outlet that provides 120 volts AC, for example. In one embodiment, the sets of windings 262 and 264 are electrically isolated from each other using insulated wire, spacer layers, etc.

Figure 4:
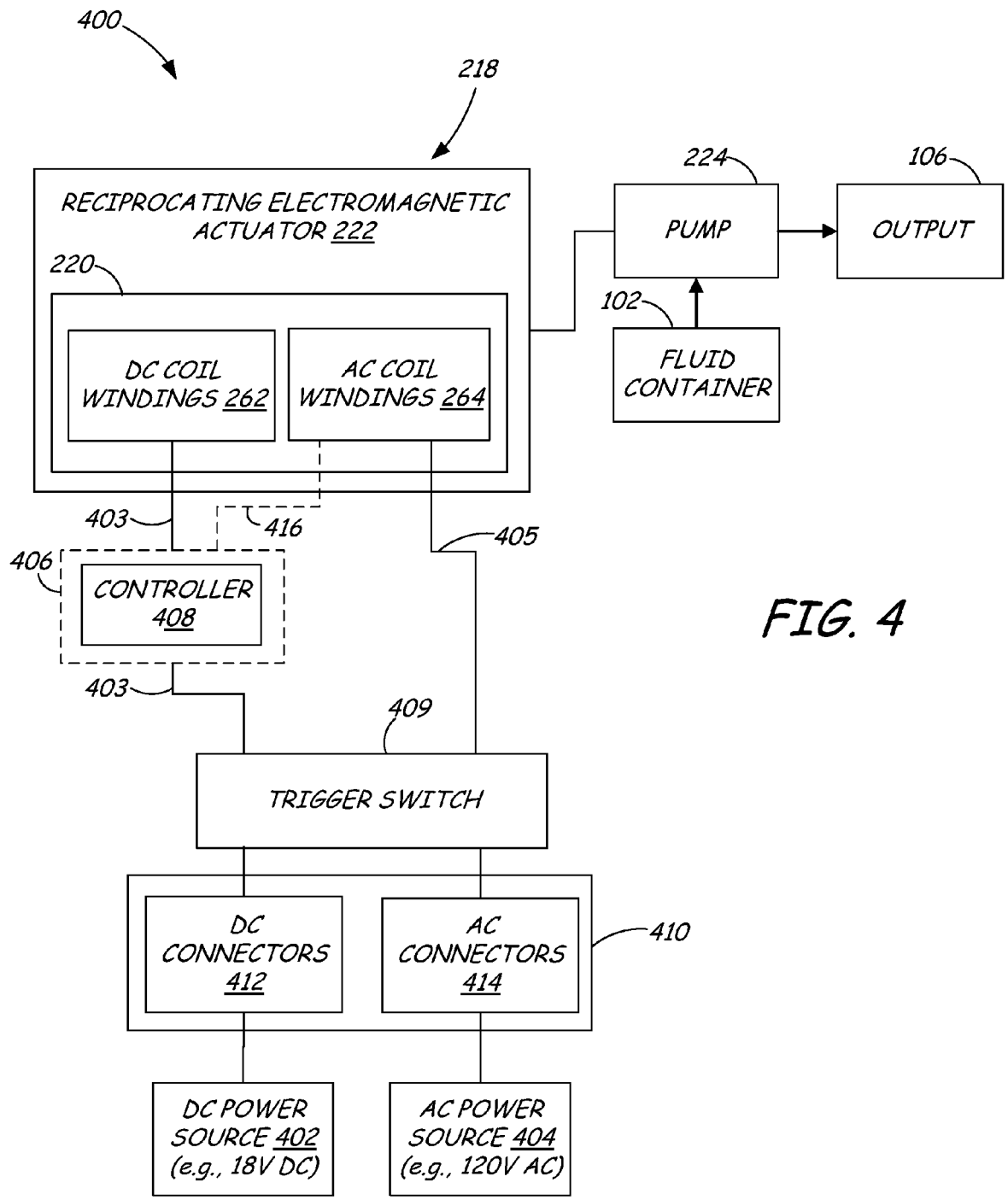
Figure 5:
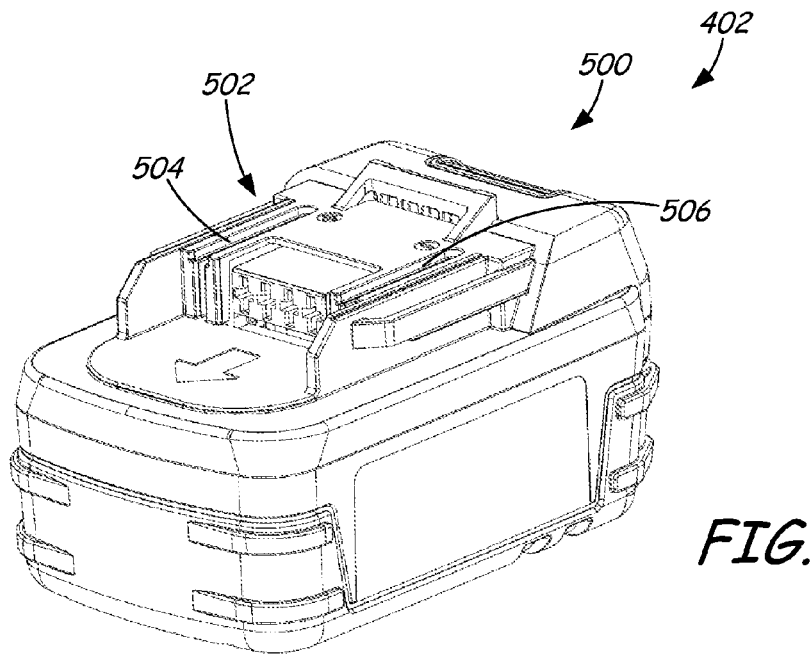

FIG. 4 illustrates a block diagram representation 400 of some components of spray gun 100. In the illustrated embodiment, windings 262 of electromagnet motor 218 comprise low-voltage windings disposed next to high-voltage windings 264. Low-voltage windings 262 are operably coupled to low-voltage power supply 402 through conductors 403. Low voltage windings 262 are configured for operations with a relatively low voltage. For example, windings 262 can be wound using relatively large wire, such as 16 gauge wire. One example of low-voltage power source 402 is illustrated in FIG. 5. As shown, power source 402 comprises a battery pack 500 configured to supply 18 VDC, for example.

Figure 6:
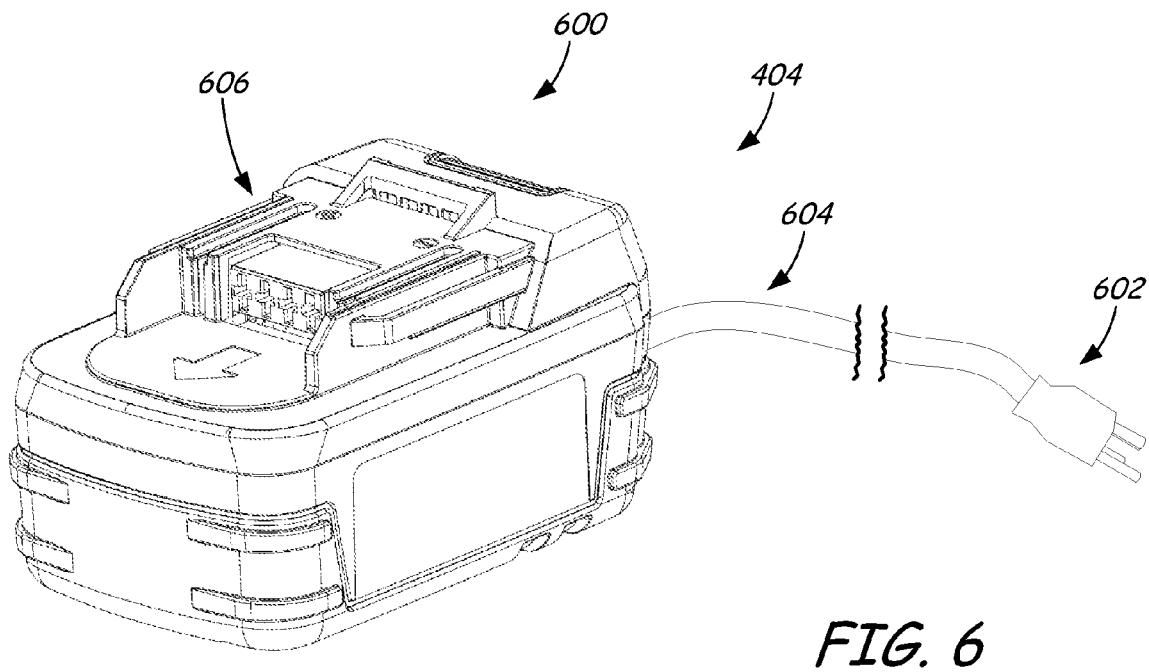

Referring again to FIG. 4, high-voltage windings 264 are operably coupled to a source 404 of relatively high-voltage electrical power through conductors 405. High voltage windings 264 are configured for operation with a relatively high voltage, such as 120 VAC or 240 VAC. As such, windings 264 are wound from a relatively thinner wire such as current wire and/or other types of wire having a smaller gauge as compared to windings 262. One example of high-voltage power source 404 is illustrated in FIG. 6. As shown, source 404 comprises a module or adapter 600 that is couplable to a wall outlet (e.g., 120 VAC or 240 VAC) by a plug 602 and cord 604.

Referring again to FIG. 4, in accordance with one embodiment when power source 402 (e.g., battery pack 500) is attached to the portable airless fluid sprayer (i.e., attached to receptacle 110 of spray gun 100) the low voltage power is provided to a printed circuit board (PCB) 406 through trigger switch 409 (e.g., trigger 114) in response to user operation of the trigger, for example. The low voltage power is provided to the windings of low voltage coil 262 through PCB 406. In one embodiment, PCB 406 comprises one or more components forming a controller 408 configured to control the power supplied to windings 262. For example, in one embodiment controller 408 supplies pulses of current to windings 262 by performing pulse width modulation, etc.

In accordance with one embodiment, when power source 404 (e.g., module 600) is attached to the portable airless fluid sprayer (i.e., attached to receptacle 110 of spray gun 100) the high voltage power is provided to the windings of high-voltage coil 264 through trigger switch 409 (e.g., trigger 114) in response to user operation of the trigger, for example. In one embodiment, the high voltage power bypasses PCB 406 and is provided directly to windings 264.

Preferably, the modules of power supplies 402 and 404 (e.g., battery pack 500 and module 600) are shaped similarly such that they are removably and interchangeably couplable to receptacle 110 of spray gun 100. Block 410 in FIG. 4 generally represents electrical connectors of receptacle 110. Receptacle 110 illustratively includes a plurality of electrical connectors that accommodate corresponding electrical connectors of battery pack 500 and module 600. In one embodiment, receptacle 110 comprises four electrical connectors, for example. The electrical connectors 410 are preferably arranged such that a first set of the connectors (represented by block 412) couple to wires 403 and a second, different set of the connectors (represented by block 414) couple to wires 405. In one embodiment, the first set of connectors 412 (e.g., two electrical connectors) of receptacle 110 are configured to only make electrical contact with a low-voltage module, such as battery back 500. Similarly, the second set of connectors 414 (e.g., two electrical connectors) of receptacle 110 are configured to only make electrical contact with a high-voltage module, such as module 600. In this manner, the risk that a high-voltage module will couple to the low-voltage coils is substantially reduced or eliminated altogether. This is important since extreme damage to the spray gun could occur if high-voltage were coupled to the low-voltage coils.

In the embodiments illustrated in FIGS. 5 and 6, each of battery pack 500 and module 600 include the same or substantially similar form factors allowing battery pack 500 and module 600 to be interchangeably received by receptacle 110 of spray gun 100. Battery pack 500 and module 600 include connection structures 502 and 606, respectively, including electrical connectors. The set of electrical connectors of structure 502 are configured to engage and make electrical contact with the set of electrical connectors 412 of receptacle 110. In one embodiment, the electrical connectors are provided in slots 504 and 506 of structure 502. The set of electrical connectors of structure 606 are configured to engage and make electrical contact with the set of electrical connectors 414 of receptacle 110. The electrical connectors of module 600 can comprise any suitable structure of module 600. For example, components of module 600 corresponding to unused components of battery pack 500 can be configured to make electrical contact with receptacle 110.

While embodiments herein are described with respect to two distinct sets of coil windings, it is expressly contemplated that embodiments can be practiced where low-voltage operation also engages the high-voltage coils. For instance, in one embodiment wires 416 can couple controller 408 to coil windings 264. In another embodiment, DC power source 402 can be configured to also engage connectors 414. In another embodiment, the low-voltage coils and high-voltage coils are connected in series. The DC power is configured to be applied across both the low-voltage and high-voltage coils connected in series while the AC power is only applied to the high-voltage coils, for example by providing one or more taps between the low-voltage and high-voltage coils. Operation of the high-voltage coils using the relatively low voltage source can provide some additional assistance to drive the actuator. However, operation using a high-voltage source does not use the low-voltage coils.

While embodiments herein have generally been described with respect to low-voltage coils being wound in a first portion of the motor that is next to a second portion where the high-voltage coils are wound, embodiments can include interwinding or interleaving the first and second portions such that they substantially overlap as long as the first and second windings are electrically isolated from one another. This may allow some of the interstitial spaces between the larger windings to be filled with the relatively thinner high-voltage windings. In one embodiment, the coil winding portions can be layered over one another. For example, the high voltage coils can be wound over top of the low voltage coils (i.e., the low voltage coils are positioned between the core and the high voltage coils), or vice versa. Additionally, while the high-voltage and low-voltage coils are shown disposed next to each other, other configurations can be utilized where the coil portions are not necessarily next to each other.

While embodiments herein have generally been described as using a plurality of distinct windings having different wire gauges, it is contemplated that embodiments of the present invention can be practiced using windings of a single wire gauge with one or more taps in the windings to accommodate the different voltages.

It is believed that embodiments described herein can provide a number of advantages for a dual-voltage airless fluid delivery gun. For instance, by not requiring a transformer, the additional cost of that component is avoided. Further, the electrical efficiency losses associated with such a transformer are avoided as well.

While various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed:

1. A dual-voltage electric airless fluid sprayer comprising:
a pump configured to receive fluid from a fluid source;
an electric motor operably coupled to the pump, wherein the electric motor includes a plurality of windings, the plurality of windings comprising a first winding portion having a first wire gauge and a first number of windings and a second winding portion having a second wire gauge and second number of windings; and
a power module receiving portion configured to receive a power module to couple one of the first or second winding portions to a source of electrical power, wherein the first winding portion is configured to receive power from a direct current (DC) power source for operating the pump, and the second winding portion is configured to receive power from an alternating current (AC) power source for operating the pump.

2. The dual-voltage electric airless fluid sprayer of claim 1, wherein the first wire gauge and second wire gauge are different.

3. The dual-voltage electric airless fluid sprayer of claim 1, wherein the power module receiving portion is configured to receive a first power module providing a source of power at a first voltage and a second power module providing a source of power at a second voltage that is higher than the first voltage.

4. The dual-voltage electric airless fluid sprayer of claim 1, wherein the first and second numbers are different.

5. The dual-voltage electric airless fluid sprayer of claim 1, wherein the first winding portion comprises a first set of windings and the second winding portion comprises a second, separate set of windings.

6. The dual-voltage electric airless fluid sprayer of claim 1, wherein the first winding portion comprises a first set of windings and the second winding portion comprises a second set of windings, wherein at least a portion of the first set of windings is interleaved with at least a portion of the second set of windings.

7. A dual-voltage electric airless fluid sprayer comprising:
a pump configured to receive fluid from a fluid source;
an electric motor operably coupled to the pump, wherein the electric motor includes a plurality of windings, the plurality of windings comprising a first winding portion having a first wire gauge and a first number of windings and a second winding portion having a second wire gauge and second number of windings; and
a power module receiving portion configured to receive a first power module providing a source of power at a first voltage and a second power module providing a source of power at a second voltage that is higher than the first voltage, wherein the power module receiving portion comprises a plurality of electrical contacts, wherein a first set of the plurality of electrical contacts couple to electrical conductors providing power to the first winding portion and are configured to electrically contact the first power module and wherein a second, different set of the plurality of electrical contacts couple to electrical conductors providing power to the second winding portion and are configured to electrically contact the second power module.

8. The dual-voltage electric airless fluid sprayer of claim 7, wherein the power module receiving portion is configured to receive the second power module such that the second power module does not electrically contact the first set of the plurality of electrical contacts.

9. The dual-voltage electric airless fluid sprayer of claim 7, wherein at least a portion of the power supplied from the first power module is applied to the second winding portion.

10. The dual-voltage electric airless fluid sprayer of claim 7, and further comprising circuitry coupled to the electrical conductors providing power to the first winding portion, wherein the electrical conductors coupled to the second set of the plurality of electrical contacts bypass the circuitry.

11. The dual-voltage electric airless fluid sprayer of claim 7, wherein the first winding portion is configured to receive power from a direct current (DC) power source for operating the pump, and the second winding portion is configured to receive power from an alternating current (AC) power source for operating the pump.

12. The dual-voltage electric airless fluid sprayer of claim 7, wherein the first wire gauge and second wire gauge are different.

13. The dual-voltage electric airless fluid sprayer of claim 7, wherein the first and second numbers are different.

14. A dual-voltage electric airless fluid sprayer comprising:
a pump configured to receive fluid from a fluid source;
an electric motor operably coupled to the pump, wherein the electric motor includes a plurality of windings, the plurality of windings comprising a first winding portion having a first wire gauge and a first number of windings and a second winding portion having a second wire gauge and second number of windings; and
a power module receptacle including a plurality of electrical contacts, wherein the power module receptacle is configured to receive a first power module having a first voltage such that a first set of the plurality of electrical contacts electrically engage the first power module, and wherein the power module receptacle is configured to receive a second power module having a second voltage such that a second, different set of the plurality of electrical contacts electrically engage the second power module.

15. The dual-voltage electric airless fluid sprayer of claim 14, wherein the power module receptacle comprises a portion of a handle of the airless fluid sprayer.

16. The dual-voltage electric airless fluid sprayer of claim 15, wherein the power module receptacle is configured to receive the first and second power modules having a substantially similar form factor.

17. The dual-voltage electric airless fluid sprayer of claim 15, wherein the first winding portion is configured to receive power from a direct current (DC) power source for operating the pump and the second winding portion is configured to receive power from an alternating current (AC) power source for operating the pump.

18. The dual-voltage electric airless fluid sprayer of claim 15, wherein the power module receptacle is configured to receive the second power module such that it does not electrically engage the first set of the plurality of electrical contacts.

19. The dual-voltage electric airless fluid sprayer of claim 14, wherein the first wire gauge and second wire gauge are different.

20. The dual-voltage electric airless fluid sprayer of claim 14, wherein the first and second numbers are different.

* * * * *